April 11, 1933.     F. MOSCATO     1,903,737
SAFETY SWITCH
Filed Sept. 26, 1931
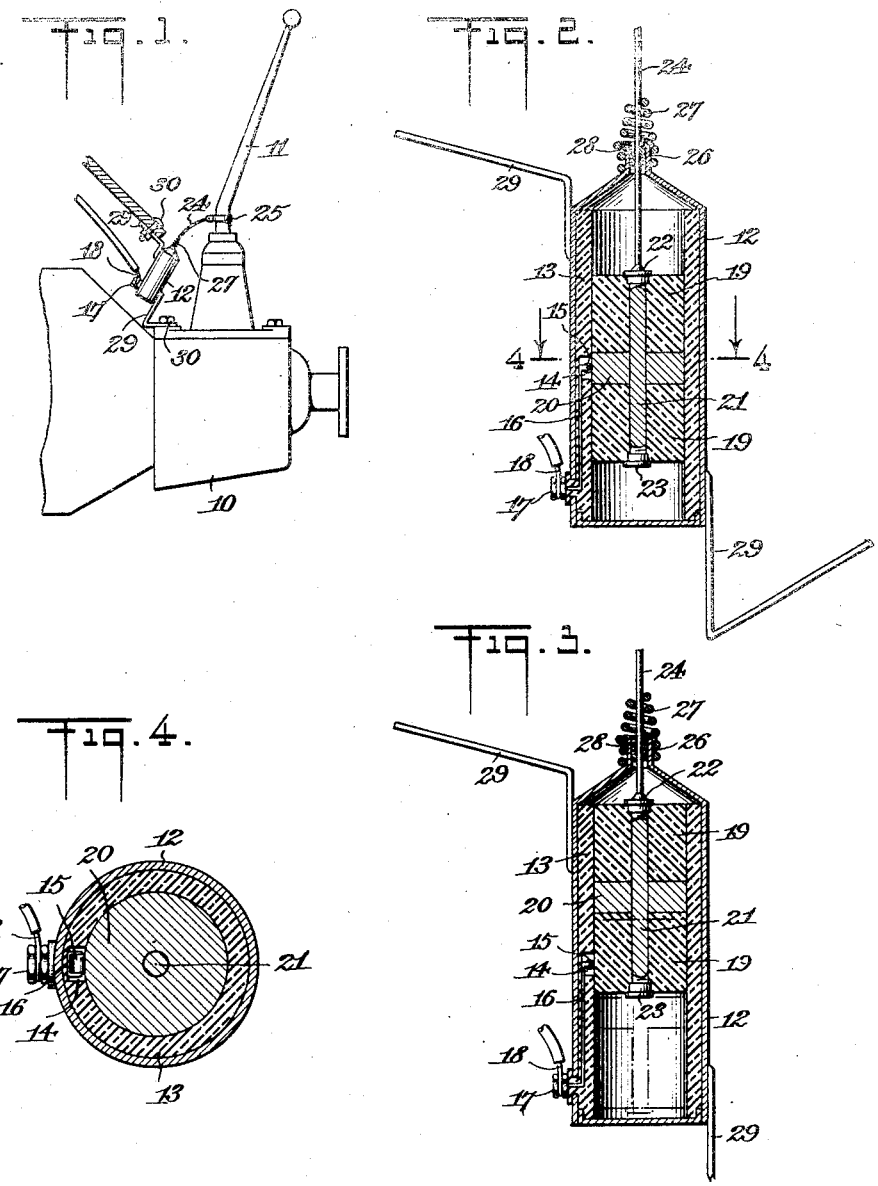
INVENTOR
Francis Moscato Patented Apr. 11, 1933

1,903,737

UNITED STATES PATENT OFFICE

FRANCIS MOSCATO, OF CENTRAL PARK, NEW YORK

SAFETY SWITCH

Application filed September 26, 1931. Serial No. 585,374.

This invention relates to a safety device or switch for internal combustion engines of automobiles and the like. The switch is primarily designed to prevent an engine of an automobile being started when the gear shift lever of the transmission is in either of its gear shifting positions, coupling the engine with the ground driving wheels, to the end, that the automobile cannot be set in motion, unintentionally, and possibly cause destruction of property and injury to persons near the automobile.

The switch may be applied to an automobile as a part thereof in the manufacture of the automobile, or the switch may be in the form of an accessory to be applied to automobiles already in use which is an important feature of the switch.

One of the objects attained is that the switch may be readily put into use, and while in use will not get out of order from causes such as dust, moisture, oil and others.

Another object of the invention is the provision of a switch of the indicated character which will be simple of construction, also suited for economic manufacture, and of efficient and substantial design.

The foregoing and other objects of the invention are attained by the combination, constructions, and functions of the parts constituting the device hereinafter fully described and illustrated in the accompanying drawing, in which,—

Figure 1 is a side view of a transmission, and the switch employed in combination therewith, the gear shift lever being shown in its neutral position;

Figure 2 is a central section of the switch which is closed as would be the case when the gear shift lever is in its neutral position;

Figure 3 is a view similar to Figure 2 but showing the switch open, the movable contact being shown in full lines in the position it would assume if the gear shift lever were in either the first or high speed positions, and said contact being shown in dot and dash lines in the position it would assume, if the gear shift lever were in either its intermediate speed or reverse position;

Figure 4 is a transverse section on the line 4—4 of Figure 2.

The illustrated embodiment of the invention involves a motion transmission means 10 of an internal combustion engine or the like which includes a gear shift lever 11. This lever is movable as usual through different paths from a neutral position to the usual other "in gear" positions. The device in the form of an electric switch operates in conjunction with the lever 11 and may be attached in any suitable manner in relation to the lever.

The device includes a metal casing 12 of tubiform, the same being cylindrical in the present instance. A lining 13 is arranged inside of the cylindrical wall of the casing, and this lining is made of suitable insulating material such as dialetco or vulcanized fiber. The lining has a recess 14 on the inside substantially midway of the ends thereof. A metal contact 15 in the form of a roller is arranged in the recess 14 and is mounted on the end of a flat springy metal strip 16 which extends through the lining 13 and extends exteriorly of the casing, the outer end thereof being provided with suitable means 17, for establishing an electrical connection with a conductor or lead wire 18. A slide is arranged within the casing 12 and is guided for movement by the lining 13, both the lining and the slide being of cylindrical formation. The slide is composed of insulator sections 19 and a metal contact section 20 arranged between the sections 19, and said sections 19 and 20 being held together by a metal rod 21 and nuts 22, 23 threaded respectively on the opposite ends of the rod 21. The insulator sections 19 may be formed of the same material as the lining 13. The contact section 20 tightly fits on the rod 21 to make a proper electrical connection between these parts. If desired, the contact section 20 and the rod sections may be formed of a single piece of metal. A push and pull element 24 consisting of a stout steel wire has one end thereof electrically connected with the nut 22 and its opposite end is electrically connected with the lever 11 by a suitable clamp 25. The casing 12 has a neck 26. A steel wire spiral guide 27 surrounds the neck 26 and projects beyond the same. The element 24 extends through felt packing 28 in the neck 26 and also through the guide 27. In this manner the element 24 will be properly guided in its movement in response to the movement of the lever 11, the guide 27 serving to prevent the element from kinking. The casing 12 has lugs 29 for attaching the device in relation to the lever 11, and in the present instance these lugs are bolted as at 30 to the floor board of the automobile and the cover of the gear case. The conductor or lead wire 18 is electrically connected with a terminal of the automatic starting switch. The element 24 as connected with the lever 11 forms a ground connection to complete a circuit through the starting motor when the contact 20 is in engagement with the contact 15.

On reference to Figure 2, it will be apparent that the slide is in a position in which the contact 20 is in engagement with the contact 15, because of the fact that the lever 11 is in its neutral position, as shown in Figure 1. It will therefore be understood that the circuit will be closed through the starting motor enabling the operator to operate the motor to start the engine by placing the key in the starting switch. In the event that the gear shift lever 11 is not in neutral position, but is in a gear shifting position, the contact 20 will be out of engagement with the contact 15, thereby breaking the circuit through the starting motor. If the lever 11 is left to remain in the first speed position or high speed position the slide will be drawn upwardly to the position shown in Figure 3 in full lines through the intervention of the element 24. The contact 20 will then be out of engagement with the contact 15 and as a result the circuit through the starting motor will be broken and it will be impossible to start the engine, thereby averting the automobile being set in motion unintentionally and possibly causing damage to property, and injury to persons near the automobile. If the lever 11 has been left in either of its forward positions, that is to say, in the intermediate speed position or reverse position, the slide will be moved to a down position, as shown in Figure 3 in dot and dash lines, in which the contact 20 will be out of engagement with the contact 15 thereby breaking the circuit to the motor for the purpose mentioned above.

I claim:

1. The combination with a gear shift lever of a motion transmission means; of a safety switch comprising a casing in fixed relation to the lever, a contact within the casing and insulated therefrom and provided with means exteriorly of the casing for connecting the same with a suitable conductor, a contact within the casing and insulated therefrom and movable into and out of engagement with said first contact, and a push and pull flexible element connected with said lever and the movable contact to move the latter into engagement with the first contact in the movement of the lever into its neutral position, and the movable contact being moved out of engagement with said first contact by said element in the movement of the lever into any of its gear shifting positions.

2. An electric switch comprising a casing of tubiform, a lining of insulating material in said casing, a contact carried by said lining and provided with means exteriorly of the casing for connecting the same with a suitable conductor, a contact which is guided for movement by said lining into and out of engagement with said first contact, and a push and pull flexible element of conducting material electrically connected with said movable contact and extending exteriorly of said casing for connection with a gear shift lever and serving to move said last contact into and out of engagement with said first contact in response to the operation of the lever.

3. An electric switch comprising a casing of tubiform, a lining of insulating material in said casing, a contact carried by said lining and provided with means exteriorly of the casing for connecting the same with a suitable conductor, a slide guided for movement by said lining, said slide having a contact movable into and out of engagement with said first contact in the movement of the slide, and a push and pull element of conducting material which is attached to the slide and electrically connected with the contact carried thereby, said element extending exteriorly of the casing for connection with a gear shift lever to operate the slide to move the slide contact into engagement with the other contact to close a circuit, and to move the slide contact out of engagement with the other contact to open the circuit in response to the movement of said lever.

4. The combination with a control member movable through different paths, of an electric switch including a casing in fixed relation to said member, a movable contact within said casing, a push and pull flexible element connected with said contact and extending exteriorly of said casing and connected with said control member to move the contact into and out of circuit closing positions in response to the movement of said control member, and means on the casing to guide said element.

5. The combination with a control member movable through different paths, of an electric switch including a casing in fixed relation to said member, a movable contact within said casing, a push and pull flexible element connected with said contact and extending exteriorly of said casing and connected with said control member to move the contact into and out of circuit closing positions in response to the movement of said control member, and means on the casing to guide said element, said means consisting of a laterally flexible guide projecting from the casing and packing on the casing in both of which said element moves.

6. The combination with a control member movable through different paths, of an electric switch including a movable contact, and a push and pull flexible element connected with the control member and contact to move the contact into and out of circuit closing positions in response to the movement of said control member.

7. The combination with a control member movable through different paths, of an electric switch including a movable contact, and a push and pull flexible element connected with the control member and contact to move the contact into and out of circuit closing positions in response to the movement of said control member, and said element also constituting a conductor for the electric current.

FRANCIS MOSCATO.